(12) United States Patent
Kuo

(10) Patent No.: US 7,209,302 B1
(45) Date of Patent: Apr. 24, 2007

(54) HINGE WITH A POSITIONING AND LIMITING ASSEMBLY

(75) Inventor: Wen-Yi Kuo, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 11/429,198

(22) Filed: May 8, 2006

(51) Int. Cl.
*G02B 7/02* (2006.01)
*E05D 7/06* (2006.01)

(52) U.S. Cl. .......................... 359/811; 359/819; 16/241
(58) Field of Classification Search ............... 359/811; 396/530; 285/401; 431/135; 16/239, 240, 16/241; 49/236, 237
See application file for complete search history.

(56) References Cited

U.S. PATENT DOCUMENTS 2,732,751 A * 1/1956 Heidecke et al. .......... 396/530

2006/0162123 A1* 7/2006 Cha .......................... 16/239
2006/0278796 A1* 12/2006 Lu et al. ..................... 248/371

* cited by examiner

*Primary Examiner*—Angela Ortiz
*Assistant Examiner*—James C. Jones
(74) *Attorney, Agent, or Firm*—Bacon & Thomas, PLLC

(57) ABSTRACT

A hinge with a positioning and limiting assembly is mounted on an electronic device with a camera and has a stationary bracket, a pivot cylinder, a stationary positioning ring and a rotating positioning ring. The stationary bracket is attached to the electronic device and has a mounting ring. The pivot cylinder is mounted rotatably through the mounting ring. The stationary positioning ring is mounted around the pivot cylinder, connects to the mounting ring and has a positioning protrusion formed on and protruding from the stationary positioning ring. The rotating positioning ring is connected to the pivot cylinder, presses against the stationary positioning ring and has multiple detents. The detents engage the positioning protrusion to hold the camera lens in place.

7 Claims, 8 Drawing Sheets

HINGE WITH A POSITIONING AND LIMITING ASSEMBLY

BACKGROUND OF THE INVENTION

1. Field of Invention

The present invention relates to a hinge, and more particularly to a hinge used in an electronic device with a camera lens and having a positioning and limiting assembly.

2. Description of the Related Art

Many electronic devices such as mobile phones, MPEG audio layer 3 players (MP3 players) and record pens have a body and a camera lens. The body has a front surface, a rear surface and a screen. The screen is mounted on the front surface. The camera lens is mounted on the rear surface of the body opposite to the screen and sends detected images to the screen. However, a conventional camera lens is mounted immovably on the body, so people are able to view the image on the screen to control the camera lens to center objects or people in a picture only when the camera lens is pointed away from the person shooting the picture. When people take pictures of themselves, they cannot view the screen and control the camera lens.

Some flip-open mobile phones have a hinge, a base, a screen, a cover and a camera lens. The screen is mounted in the base. The cover connects pivotally and rotatably to the base by the hinge. The camera lens is mounted in the cover. Because the hinge allows the cover with the camera lens to rotate, people can view the screen and shoot pictures of themselves. However, other mobile phones and electrical devices cannot use this kind of hinge, so people are limited to shooting pictures of themselves "in the blind" because the camera lenses are still not rotatable.

To overcome the shortcomings, the present invention provides a hinge with a positioning and limiting assembly to mitigate or obviate the aforementioned.

SUMMARY OF THE INVENTION

The primary objective of the present invention is to provide a hinge for an electronic device with a camera lens, which has a positioning and limiting assembly.

To achieve the objective, a hinge with a positioning and limiting assembly in accordance with the present invention has a stationary bracket, a pivot cylinder, a stationary positioning ring and a rotating positioning ring. The stationary bracket has a mounting ring having an inner edge and a rotational limit formed on and protruding from the inner edge. The pivot cylinder is mounted rotatably through the mounting ring. The stationary positioning ring is mounted around the pivot cylinder, is connected to the mounting ring and has a front surface, a rear surface and a positioning protrusion. The front surface abuts the mounting ring. The positioning protrusion is formed on and protrudes from the rear surface of the stationary positioning ring. The rotating positioning ring is connected to the pivot cylinder, presses against the rear surface of the stationary positioning ring and has an outer edge having multiple detents to selectively engage the positioning protrusion to hold the pivot cylinder in position.

Other objectives, advantages and novel features of the invention will become more apparent from the following detailed description when taken in conjunction with the accompanying drawings.

DETAILED DESCRIPTION OF THE INVENTION

Figure 1:
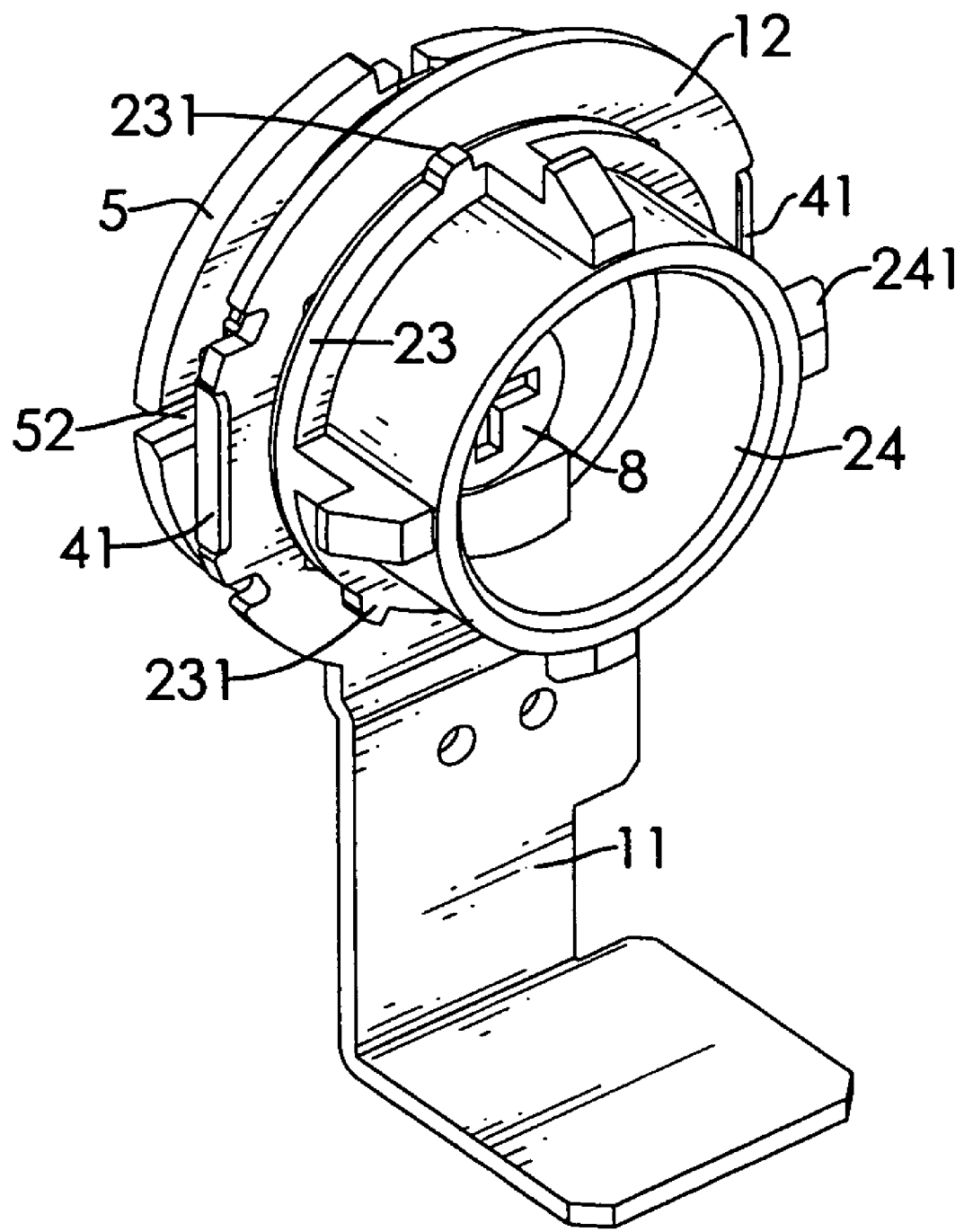
FIG. 1 is a perspective view of a hinge with a positioning and limiting assembly in accordance with the present invention.
Figure 2:
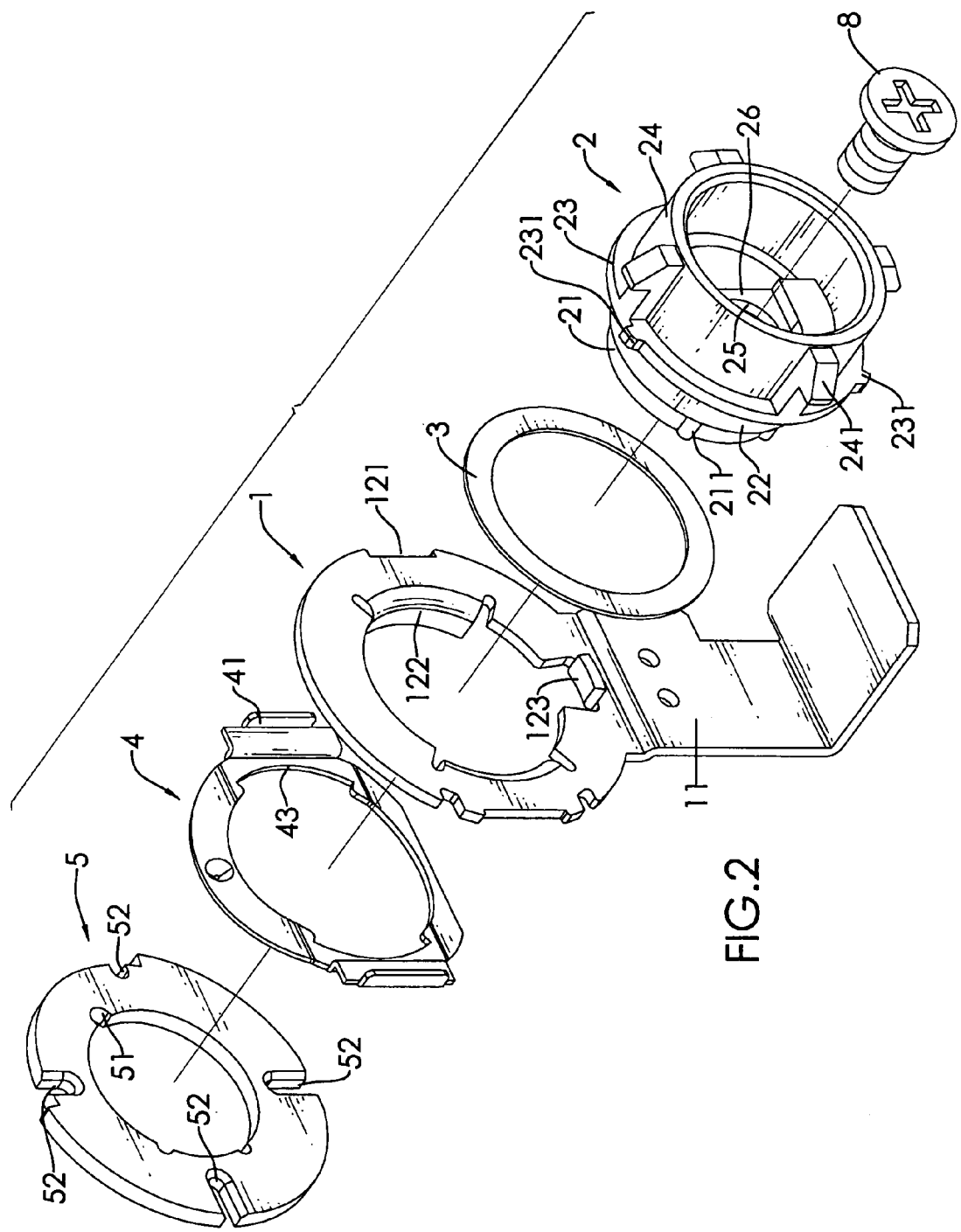
FIG. 2 is an exploded perspective view of the hinge in FIG. 1.
Figure 3:
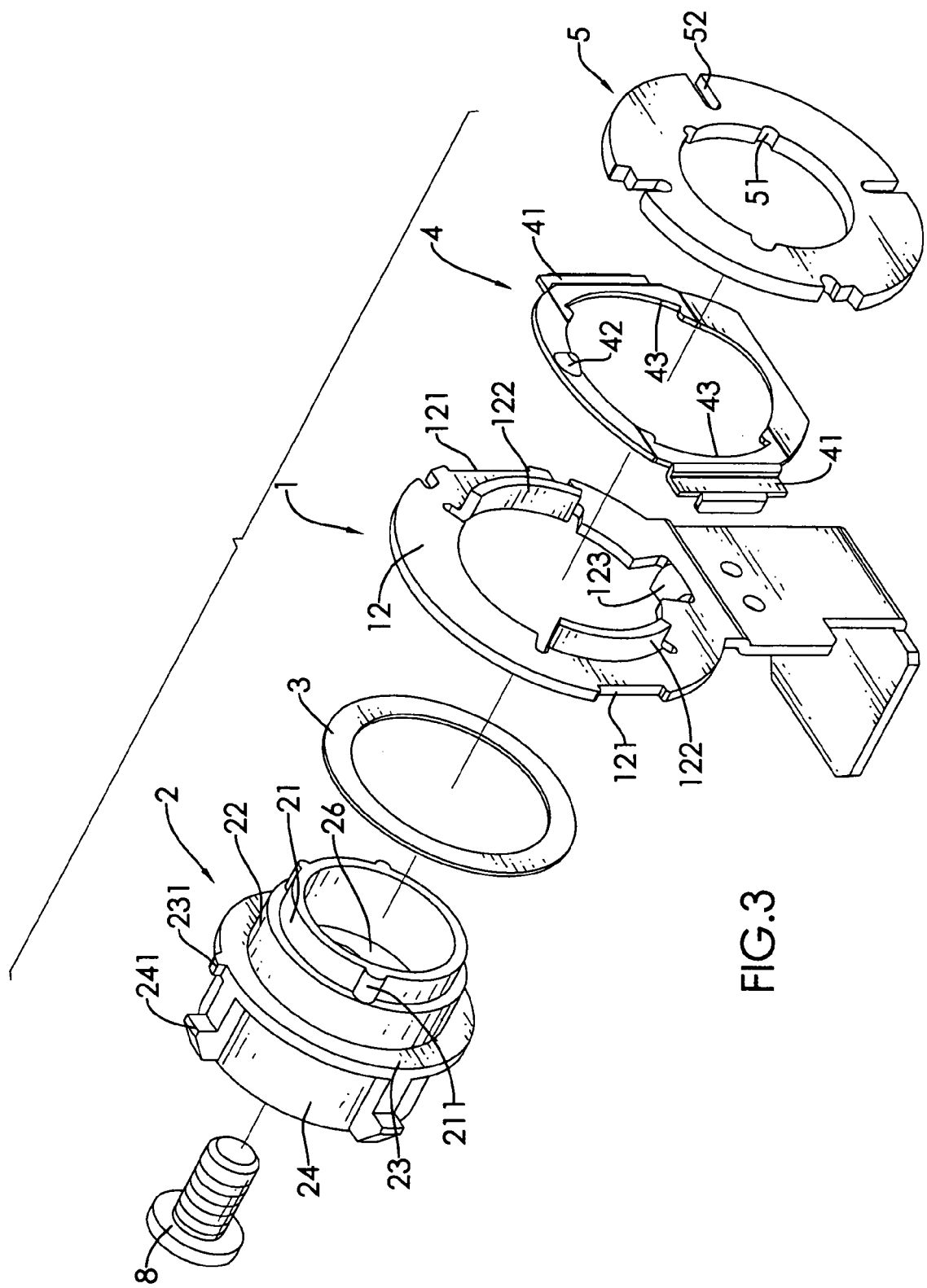
FIG. 3 is another exploded perspective view of the hinge in FIG. 1.
Figure 4:
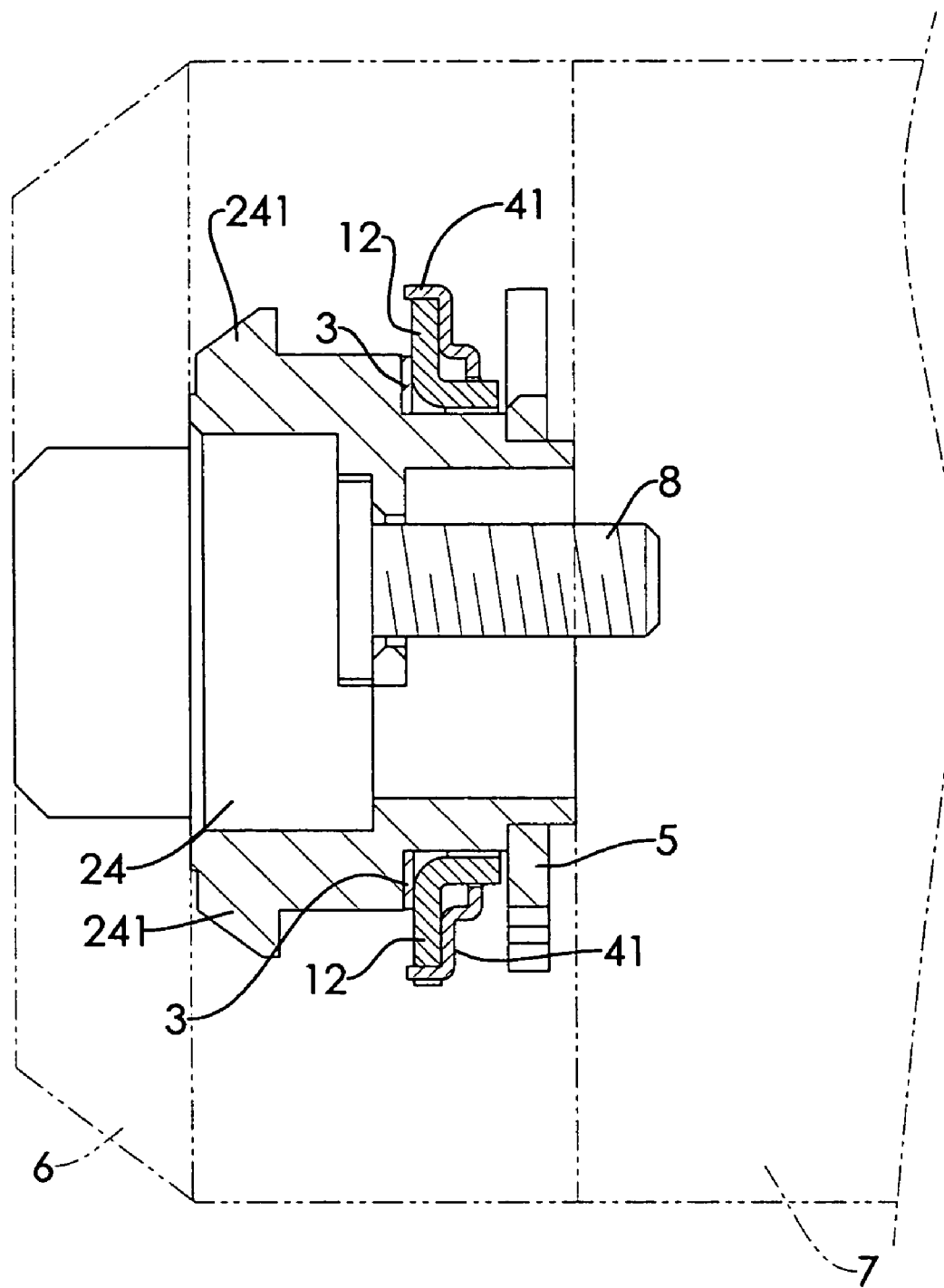
FIG. 4 is a top view in partial section of the hinge in FIG. 1 in an electrical device to connect a body and a camera lens.

With reference to FIGS. 1 to 4, a hinge with a positioning and limiting assembly in accordance with the present invention is mounted in an electronic device having a body (6) and a camera lens (7) and has a stationary bracket (1), a pivot cylinder (2), a fastener (8), a washer (3), a stationary positioning ring (4) and a rotating positioning ring (5).

The stationary bracket (1) has a connecting arm (11) and a mounting ring (12). The connecting arm (11) is L-shaped, attaches to the body (6) of an electronic device and has an arm and a foot. The arm has a proximal end, a distal end and two edges. The foot is formed on the proximal end and is perpendicular to the arm. The mounting ring (12) is formed longitudinally on the distal end of the arm and has a central hole, a front surface, a rear surface, an outer edge, an inner edge, two keys (122) and a rotational limit (123). The central hole has a diameter. The outer edge has two sides and two clip seats (121). The clip seats (121) are formed respectively in the sides of the outer edge and are diametrically opposite to each other. The inner edge has two sides and a bottom. The keys (122) are formed respectively on the sides of the inner edge and protrude longitudinally from the rear surface of the mounting ring (12). The rotational limit (123) is formed on the mounting ring (12) at the bottom of the inner edge and protrudes longitudinally from the front surface of the mounting ring (12).

The pivot cylinder (2) is hollow, is mounted rotatably in the mounting ring (12) of the stationary bracket (1) and has a rear end, a front end, a mounting segment (21), an annular bearing surface (22), a longitudinal limit (23), an optional mounting barrel (24), a transverse wall (26) and a through hole (25).

The mounting segment (21) is formed on the rear end of the pivot cylinder (2), extends rotatably through the central hole in the mounting ring (12) and has an outside diameter, a front end, an outer surface and multiple mounting protrusions (211). The outside diameter is smaller than the diameter of the central hole in the mounting ring (12). The mounting protrusions (211) are formed at intervals on the outer surface.

The annular bearing surface (22) is formed on and protrudes longitudinally from the front end of the mounting segment (21), is mounted rotatably in the central hole of the mounting ring (12), rotatably presses against the keys (122), holds the pivot cylinder (2) in longitudinal alignment and has a front end.

Figure 5:
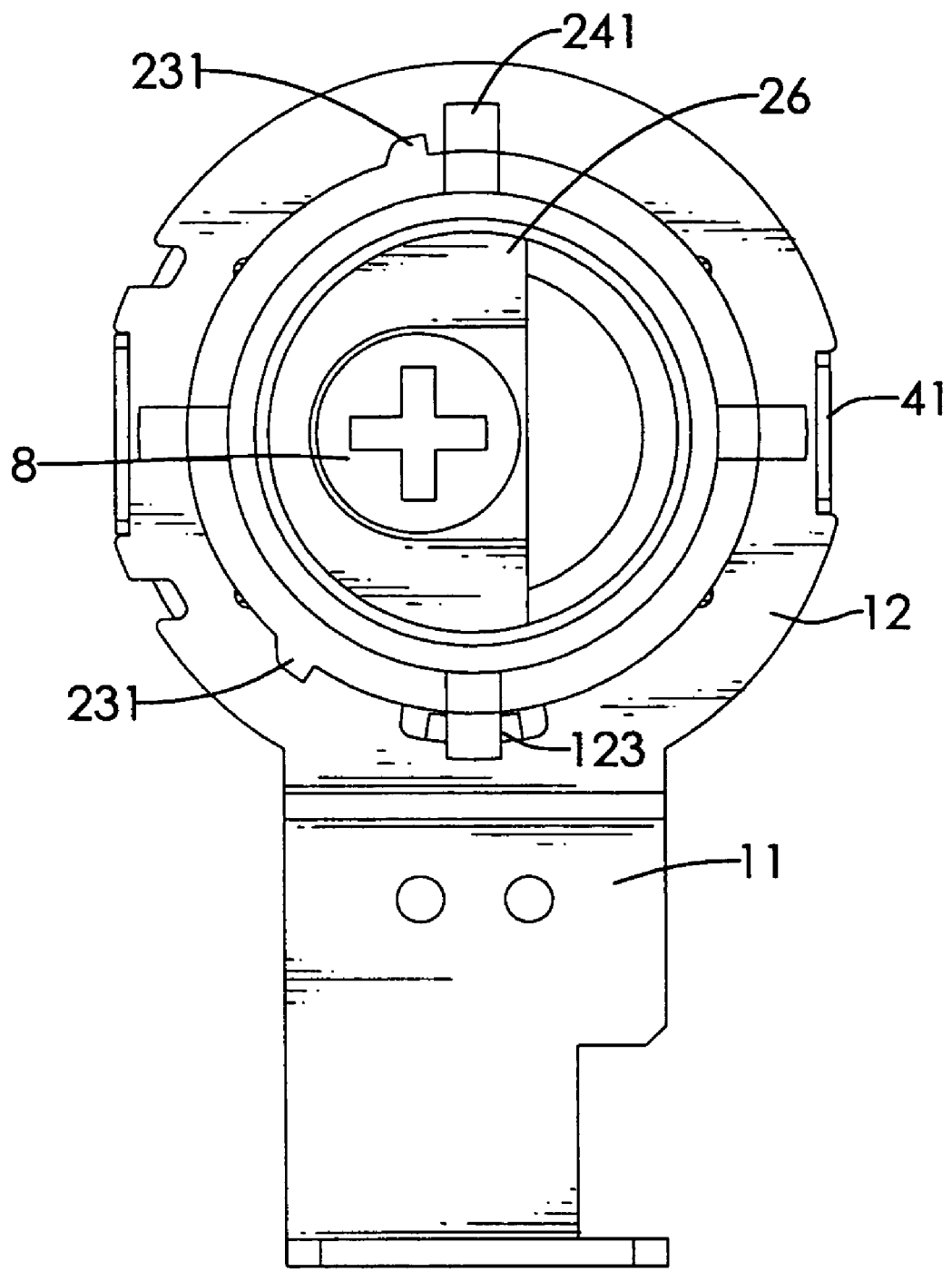
FIG. 5 is an operational front view of the hinge in FIG. 1 with the camera lens facing in the same direction as the screen.
Figure 6:
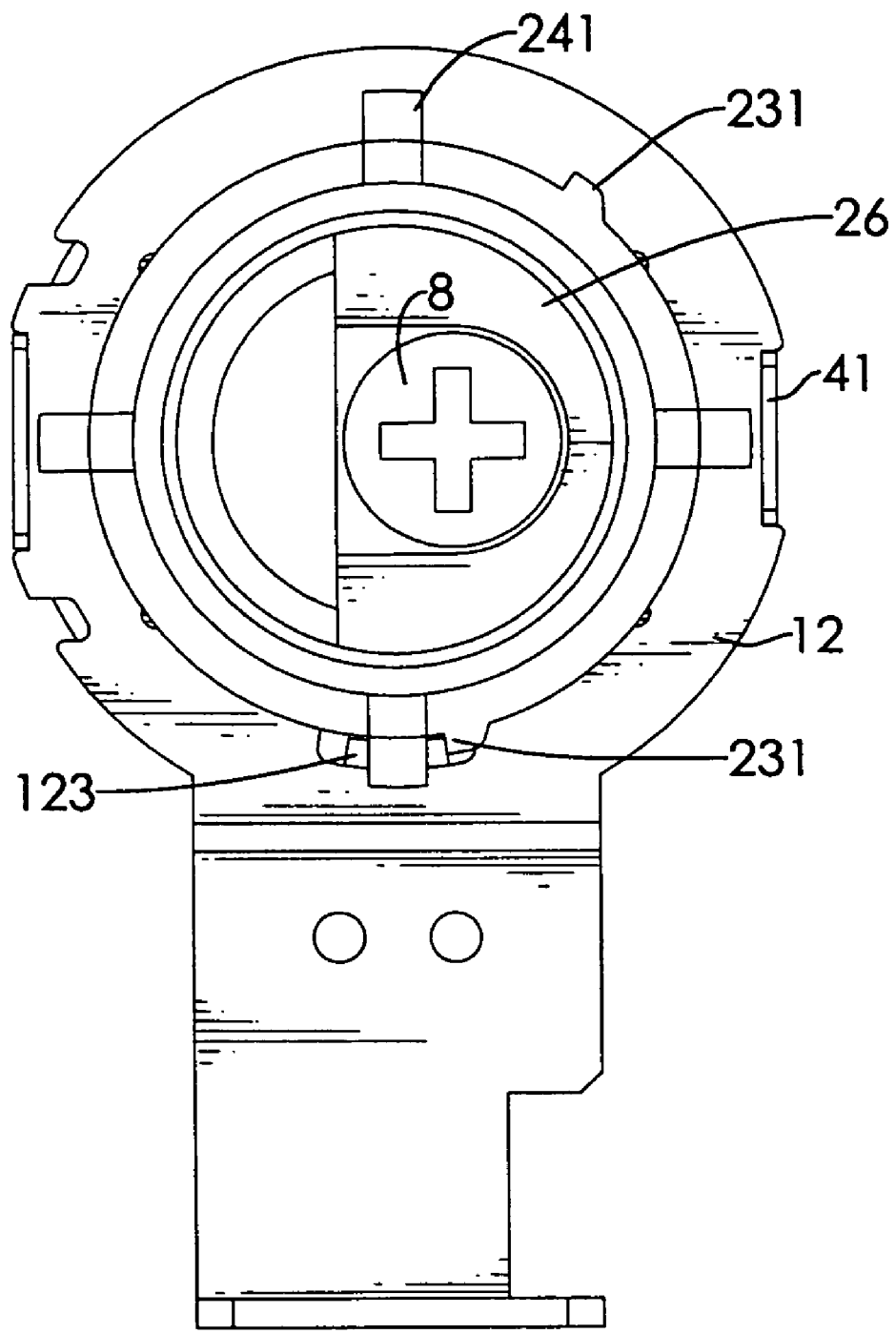
FIG. 6 is an operational front view of the hinge in FIG. 1 with the camera lens facing away from the screen.
Figure 7:
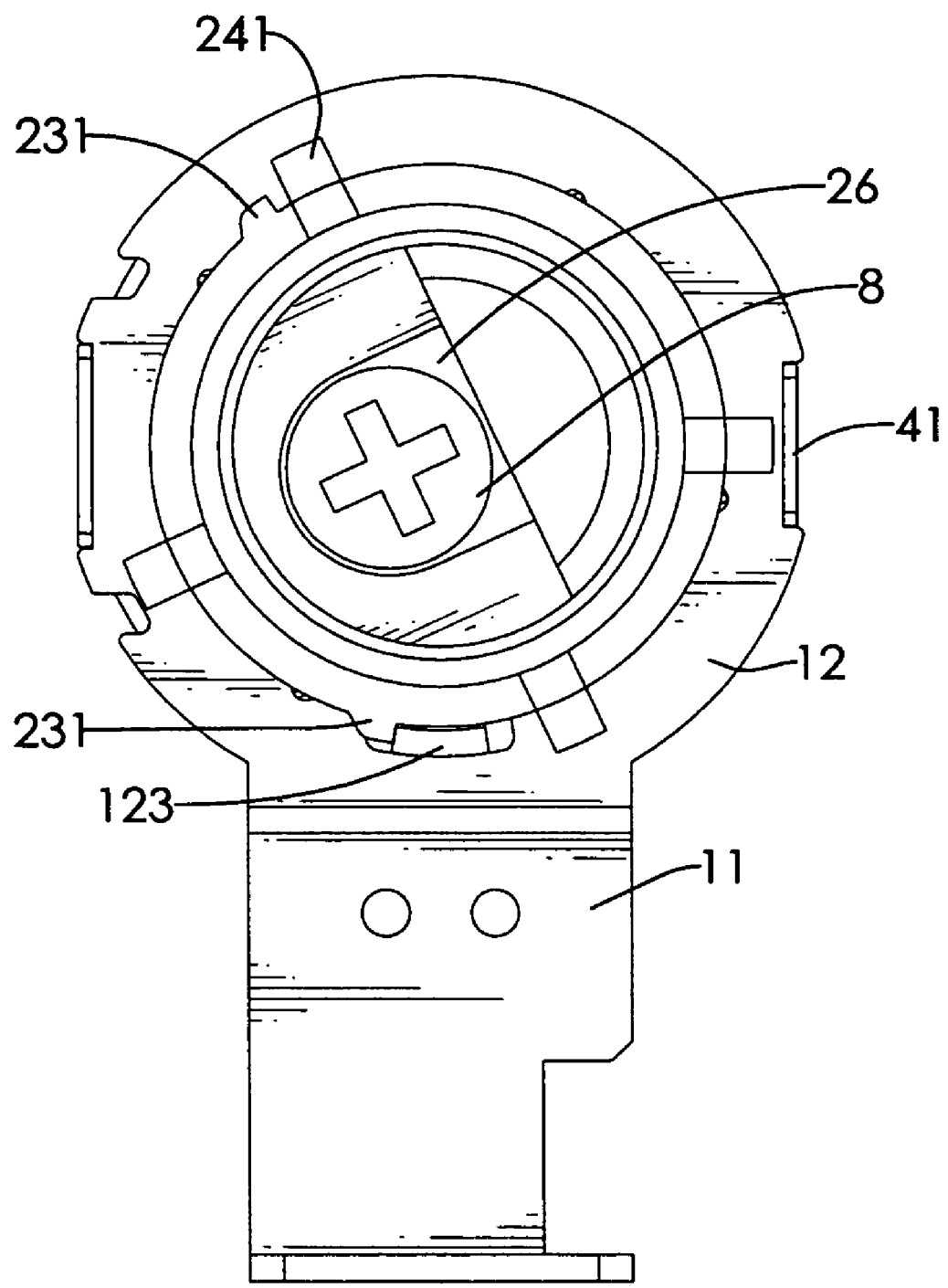
FIG. 7 is an operational front view of the hinge in FIG. 1 with the camera lens facing in the same direction as the screen at an angle.

With further reference to FIGS. 5 to 7, the longitudinal limit (23) is formed on and protrudes radially out from the front end of the annular bearing surface (22) and has an outer edge, an outside diameter and two rotational stops (231). The outer edge presses slidably against the rotational limit (123). The outside diameter of the longitudinal limit (23) is bigger than the diameter of the central hole of the mounting ring (12), so the longitudinal limit (23) abuts the front surface of the mounting ring (12). The rotational stops (231) are formed on and protrude radially out from the outer edge at an interval and selectively abut the rotational limit (123) to allow the pivot cylinder (2) to rotate between the rotational stops (231). The interval between the two rotational stops (231) contacting to the rotational limit (123) has an angle of at least 180°.

The mounting barrel (24) is cylindrical, is formed coaxially on and protrudes from the longitudinal limit (23) toward the front end of the pivot cylinder (2), is rotatably attached to the body (6) of the electronic device, has an outside surface and may have a fixed fastener. The fixed fastener connects rotatably to the body (6) of an electronic device and may be multiple hooks (241) or an annular lip. The hooks (241) are formed on and protrude out from the outside surface of the mounting barrel (24). The annular lip is formed on and protrudes out from the outside surface of the mounting barrel (24).

The transverse wall (26) is formed inside the pivot cylinder (2).

The through hole (25) is formed longitudinally through the transverse wall (26).

Figure 8:
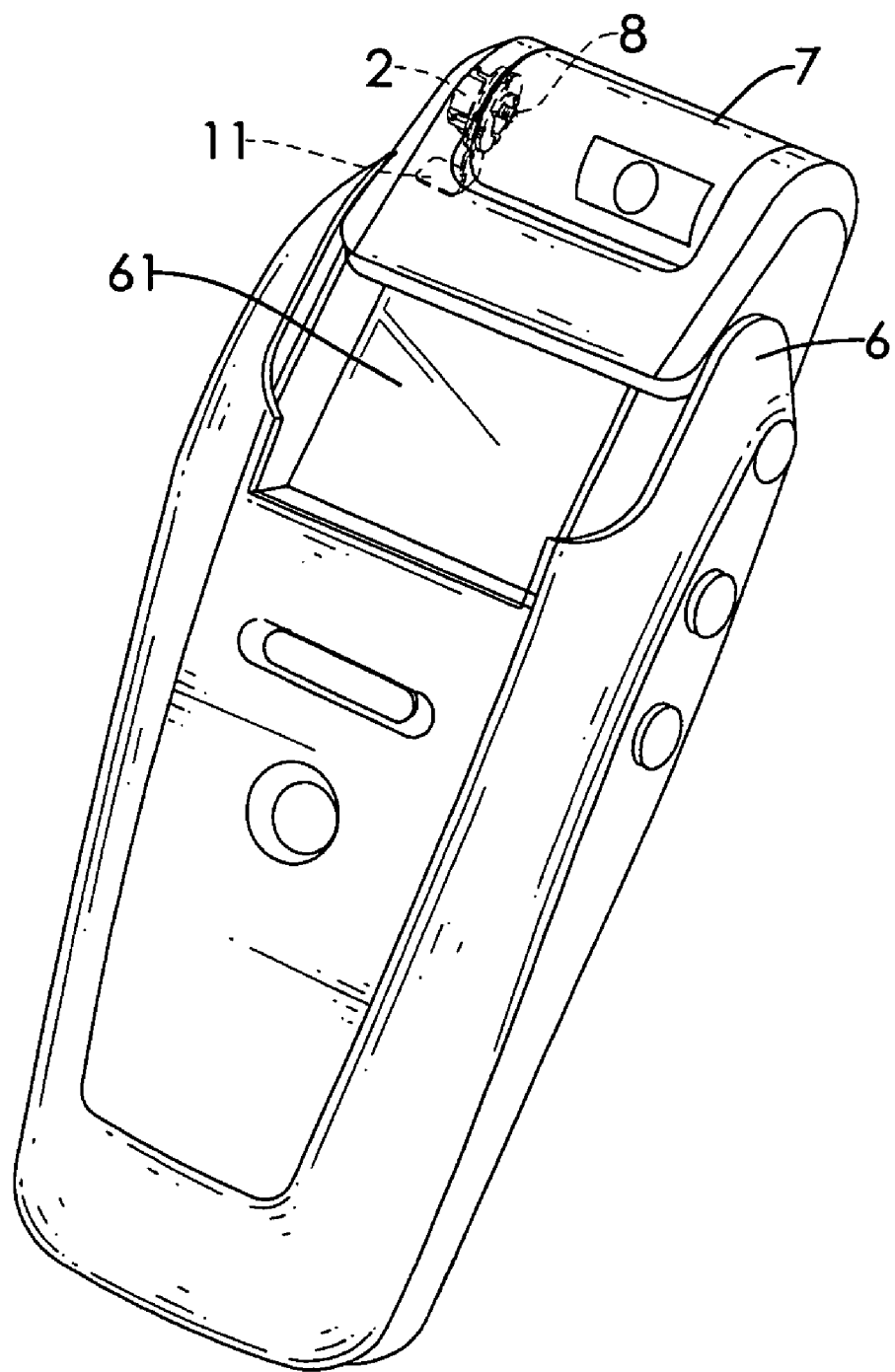
FIG. 8 is an operational perspective view of an electronic device with the hinge in FIG. 4 connecting a camera lens to the electronic device.

With further reference to FIG. 8, the fastener (8) is mounted in the through hole (25), attaches securely to the camera lens (7), attaches the pivot cylinder (2) securely to the camera lens (7) and may be a bolt.

The washer (3) is mounted around the pivot cylinder (2) between the front surface of the mounting ring (12) and the longitudinal limit (23) of the pivot cylinder (2) to increase the area providing friction. Therefore, the friction is increased and is sufficient to hold the camera lens (7) easily at any desired angle.

The stationary positioning ring (4) is resilient, is mounted around the rear end of the pivot cylinder (2), is attached to the rear surface of the mounting ring (12) and has a front surface, a rear surface, a protruding sector, an inner edge, an outer edge, two clamps (41) and a positioning protrusion (42). The front surface abuts the rear surface of the mounting ring (12). The protruding sector protrudes slightly toward the rear surface such that the front surface separates from the mounting ring (12). The inner edge has two sides and two keyways (43). The keyways (43) are formed respectively in the sides and are mounted respectively on the keys (122) of the mounting ring (12) to hold the stationary positioning ring (4) in position relative to the mounting ring (12). The outer edge has two sides. The clamps (41) are resilient, are formed respectively on the sides of the outer edge, protrude from the front surface and connect respectively to the clip seats (121) to attach the stationary positioning ring (4) to the mounting ring (12). The positioning protrusion (42) is formed on and protrudes from the rear surface of the stationary positioning ring (4) in the protruding sector.

The rotating positioning ring (5) is mounted securely around the mounting segment (21) of the pivot cylinder (2), abuts the rear surface of the stationary positioning ring (4) at the protruding sector and has a central through hole, an inner edge, an outer edge, a front surface, multiple mounting notches (51) and multiple detents (52). The inner edge is mounted on the mounting segment (21) of the pivot cylinder (2). The mounting notches (51) are formed in the front surface and correspond to and engage the mounting protrusions (211) on the mounting segment (21) to keep the rotating positioning ring (5) from rotating on the pivot cylinder (2). The detents (52) are formed in the front surface at the outer edge, selectively engage the positioning protrusion (42) to hold the pivot cylinder (2) and the attached camera lens (7) in position relative to the mounting ring (12) and may be formed at 0°, 90°, 180° and 270°.

The hinge as described allows the camera lens (7) to face in the same direction as a screen (61) on an electronic device, so people are able to view the image on the screen to control the camera lens to center objects or people in a picture not only when the camera lens is pointed away from the person, but also when the camera lens is in facing themselves.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A hinge comprising:
    a stationary bracket having
        a connecting arm; and
        a mounting ring being formed longitudinally on the connecting arm and having
            a central hole having a diameter;
            a front surface;
            a rear surface;
            an outer edge having
                two sides; and
                two clip seats being formed respectively in the sides of the outer edge and being diametrically opposite to each other;
            an inner edge having
                two sides; and
                a bottom
            two keys being formed respectively on the sides of the inner edge and protruding longitudinally from the rear surface of the mounting ring; and
            a rotational limit being formed on the mounting ring at the bottom on the inner edge and protruding longitudinally from the front surface of the mounting ring;
    a pivot cylinder being hollow, being mounted rotatably in the mounting ring of the stationary bracket and having
        a rear end;
        a front end;
        a mounting segment being formed on the rear end of the pivot cylinder, extending through the central hole in the mounting ring and having
            an outside diameter being smaller than the diameter of the central hole in the mounting ring;
            a front end;
            an outer surface; and
            multiple mounting protrusions being formed at intervals on the outer surface;
        an annular bearing surface being formed on and protruding longitudinally from the front end of the mounting segment, being mounted rotatably in the central hole of the mounting ring, rotatably pressing against the keys, holding the pivot cylinder in longitudinal alignment and having a front end;

a longitudinal limit being formed on and protruding radially out from the front end of the annular bearing surface and having an outer edge pressing slidably against the rotational limit;

an outside diameter being bigger than the diameter of the central hole of the mounting ring; and two rotational stops being formed on and protruding radially out from the outer edge at an interval and selectively abutting the rotational limit;

a transverse wall being formed inside the pivot cylinder; and a through hole being formed longitudinally through the transverse wall;

a fastener being mounted in the through hole;

a washer being mounted around the pivot cylinder between the front surface of the mounting ring and the longitudinal limit of the pivot cylinder;

a stationary positioning ring being resilient, being mounted around the rear end of the pivot cylinder, being attached to the rear surface of the mounting ring and having a front surface abutting the rear surface of the mounting ring;

a rear surface;

a protruding sector protruding slightly toward the rear surface such that the front surface separates from the mounting ring;

an inner edge having two sides; and two keyways formed respectively in the sides and being mounted respectively on the keys of the mounting ring;

an outer edge having two sides;

two clamps being formed respectively on the sides of the outer edge, protruding from the front surface and connecting respectively to the clip seats; and a positioning protrusion being formed on and protruding from the rear surface of the stationary positioning ring in the protruding sector; and a rotating positioning ring being mounted securely around the mounting segment of the pivot cylinder, abutting the rear surface of the stationary positioning ring at the protruding sector and having a central through hole engaging the mounting segment of the pivot cylinder;

an inner edge being mounted on the mounting segment of the pivot cylinder; and an outer edge;

a front surface;

multiple mounting notches being formed in the front surface and corresponding to and engaging the mounting protrusions on the mounting segment; and multiple detents being formed in the front surface at the outer edge and selectively engaging the positioning protrusion.

2. The hinge as claimed in claim 1, wherein the interval between the two rotational stops contacting to the rotational limit has an angle of at least 180°.

3. The hinge as claimed in claim 1, wherein the fastener is a bolt.

4. The hinge as claimed in claim 1, wherein the pivot cylinder further has a mounting barrel being cylindrical, being formed coaxially on and protruding from the longitudinal limit toward the front end of the pivot cylinder.

5. The hinge as claimed in claim 2, wherein the fastener is a bolt.

6. The hinge as claimed in claim 4, wherein the mounting barrel further has a fixed fastener.

7. The hinge as claimed in claim 6, wherein the fixed fastener is multiple hooks formed on and protruding out from the outside surface of the mounting barrel.

* * * * *